No. 630,634. Patented Aug. 8, 1899.
A. SUNDH.
PROTECTIVE CASING FOR ELECTRIC CABLES OR WIRES.
(Application filed Mar. 28, 1899.)
(No Model.)
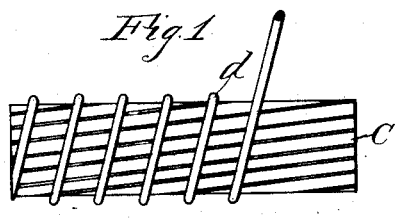
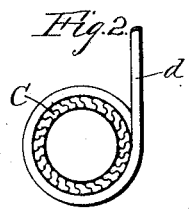
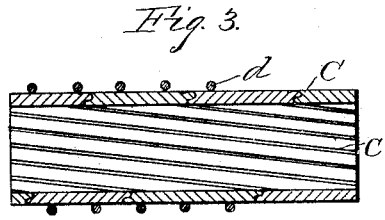
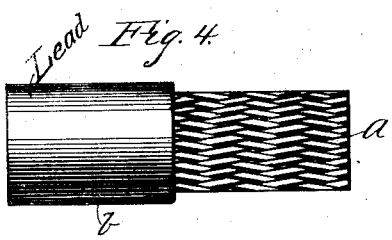
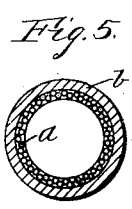
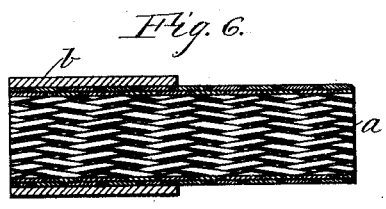
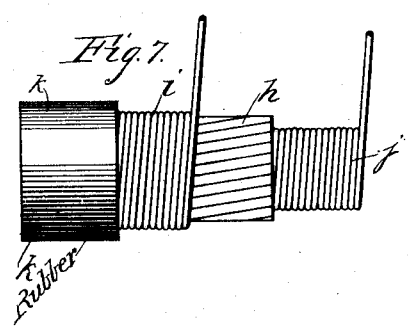
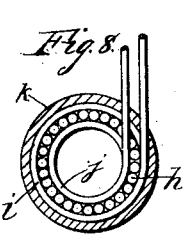
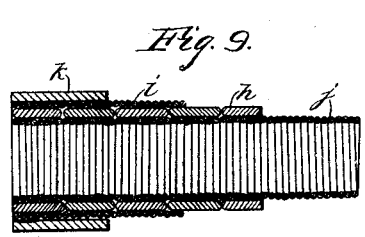
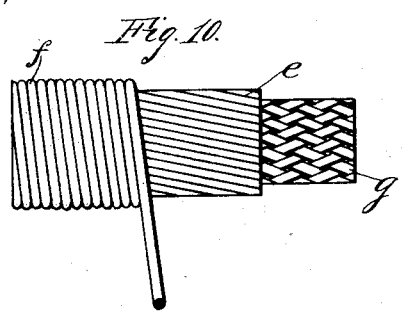
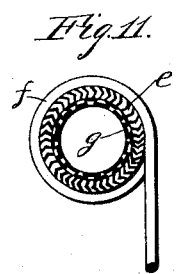
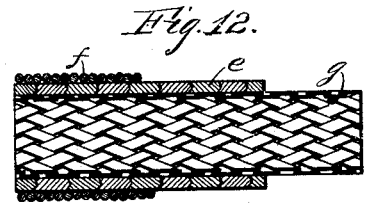
WITNESSES
L. Almquist
E. Sedgwick
INVENTOR
August Sundh
BY
A. P. Thayer
ATTORNEY

UNITED STATES PATENT OFFICE.

AUGUST SUNDH, OF YONKERS, NEW YORK.

PROTECTIVE CASING FOR ELECTRIC CABLES OR WIRES.

SPECIFICATION forming part of Letters Patent No. 630,634, dated August 8, 1899.

Application filed March 28, 1899. Serial No. 710,766. (No model.)

*To all whom it may concern:*

Be it known that I, AUGUST SUNDH, a citizen of the United States of America, and a resident of Yonkers, county of Westchester, and State of New York, have invented certain new and useful Improvements in Protective Casings for Electric Cables or Wires, of which the following is a specification.

My invention relates to the exterior metallic protective part of the cable; and it consists of the said part of the cable constructed of wire in such manner as to be flexible and at the same time capable of tensile strength to resist being pulled apart in handling, placing, and in other ways in which it may be exposed to such stresses which ordinary coils will not withstand, also so as to be nail-proof to protect the cable from nails when placed in the walls of buildings, as hereinafter described, reference being made to the accompanying drawings, in which—

Figure 1 is a side view of a short section of the protective portion of an electric cable constructed in accordance with my invention. Fig. 2 is a transverse section, and Fig. 3 a longitudinal section, of the construction represented in Fig. 1. Fig. 4 is a side view, Fig. 5 a cross-section, and Fig. 6 a longitudinal section, of another short section also constructed in accordance with my invention, but in a modified form, and having a lead exterior covering, as may sometimes be required for protection against water. Fig. 7 is a side view, Fig. 8 a transverse section, and Fig. 9 a longitudinal section, of another modification and having a rubber exterior cover which it is desirable to apply when the cable is to be placed in exposed positions in houses, because it may be painted to better advantage to correspond with the interior decorations; and Fig. 10 is a side view, Fig. 11 a transverse section, and Fig. 12 a longitudinal section, of another modification of the wire construction, with an inner lining of braided insulating material, as asbestos.

The essential object of the invention is to provide a flexible wear-resisting nail-proof wire structure of tensile strength, affording ample protection against being pulled apart by the great stresses such cables are subject to in placing them in position and removing them when required, the said structure being formed in a tube into and out of which the cable can be pulled. The essential feature of the invention is two or more coils of wire, one of which is arranged for tensile strength and so that the structure will be nail-proof, also flexible, and also durable in the matter of resisting wear.

In Figs. 4, 5, and 6 the coils of wire $a$ are closely braided together, the coils being in reverse directions, respectively, and in such length of pitch that when closely braided the tensile strength will be obtained, and the interlocked braided wires will afford practical resistance to nails when the cable is located in the walls of buildings; but this construction is more particularly adapted for lying in water, where it is less exposed to puncture, and for this special purpose it is provided with a lead cover $b$.

In Figs. 1, 2, and 3 is an inner coil $c$ of wires formed with ogee sides adapted to form close joints and a binding-coil $d$ of round wire, coil $c$ being of such length of pitch as to afford the requisite tensile strength, and in Figs. 10, 11, and 12 there is practically the same structure, except the wires of the inner coil $e$ are of V shape in cross-section and the outer coil $f$ of round wire is close, while coil $d$ is open, but it may be close also, if desired. The wires of coil $c$ are laid with the ogee sides close together and the V-wires of coil $e$ are laid close one within another and the pitch of these coils is adapted for the tensile strength.

It will be seen that when the wires of the tensile coil are formed with intermeshing sides, Figs. 2 and 11, the said coil and the binding-coil constitute a casing of great structural strength not liable to be distorted by rough usage, however severe it may be.

These casings may be made with a fireproof lining $g$ of braided asbestos or other suitable material, as represented in Figs. 10, 11, and 12.

In Figs. 7, 8, and 9 the tensile coil $h$ is of round wire with an outer coil $i$, practically the same as the outer coils $d$ and $f$, and there is an inner coil $j$ of round wire, which may be used as additional protection against nails when the tensile coil is of round wire. In this case a rubber exterior covering $k$ is represented, which is desirable when the cable is to be placed in exposed positions, as before stated.

It will be seen that the outer coils $d$, $f$, and $i$ effectively prevent the wires of the coils $c$, $e$, and $h$ from being forced apart by nails, and the wires $c$ and $e$ are so interlocked that with the binding-wires elastic metal tubes are produced that are practically as puncture-proof as solid metal tubes.

The advantages of elastic metallic casings having great tensile strength as compared with rigid iron casings are manifest and need not be more particularly pointed out.

What I claim as my invention is—

1. A flexible metallic wear-resisting protective casing for electric cables, consisting of coiled wires constructed in the form of a tube, and also constructed with part of the coils disposed for tensile strength of the case, and said case adapted for the cable to be drawn in and out.

2. A flexible metallic wear-resisting protective casing for electric cables, consisting of coiled wires comprising an inner series of wires coiled in long pitch adapted for tensile strength of the case, and exterior coils of shorter pitch binding the wires of the interior coils.

3. A flexible metallic wear-resisting protective casing for electric cables consisting of coiled wires comprising an intermediate series of wires coiled in long pitch adapted for tensile strength of the case, interior coils of shorter pitch and exterior coils of shorter pitch, the latter binding the wires of the intermediate coils.

4. A flexible metallic wear-resisting protective casing for electric cables consisting of coiled wires comprising an inner series of interlocking wires coiled in long pitch adapted for tensile strength of the case, and exterior coils of shorter pitch binding the wires of the interior coils.

5. A flexible metallic wear-resisting protective casing for electric cables consisting of coiled wires constructed in the form of a tube, and also constructed with some of the coils disposed for tensile strength of the case, and an exterior covering of material impervious to water, said case adapted for the cable to be drawn in and out.

6. A flexible metallic wear-resisting protective casing for electric cables consisting of coiled wires constructed in the form of a tube, and also constructed with some of the coils disposed for tensile strength of the case, and an interior lining of fireproof and insulating material.

7. A flexible metallic wear-resisting protective casing for electric cables or wires consisting of coiled wires comprising an inner series of wires coiled in long pitch adapted for tensile strength of the case, and exterior coils of shorter pitch binding the wires of the interior coils, the wires of the tensile coil having intermeshing sides.

Signed by me at New York, N. Y., this 25th day of March, 1899.

AUGUST SUNDH.

Witnesses:
C. SEDGWICK,
J. HOWARD.